Jan. 20, 1953 H. J. HAMMERLY 2,626,301
BUS DUCT SYSTEM OF POWER DISTRIBUTION
Filed Jan. 29, 1949 6 Sheets-Sheet 1
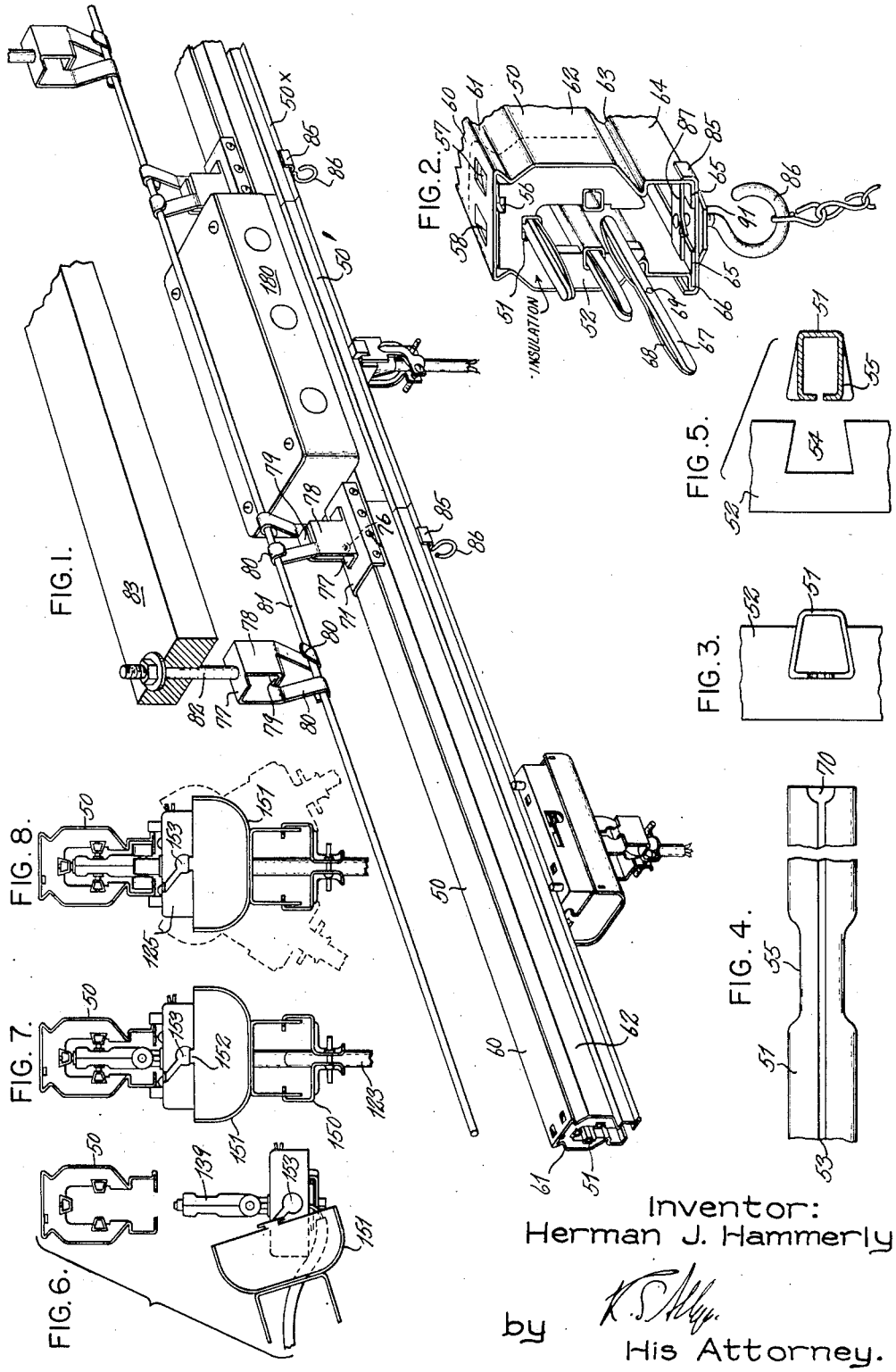
Inventor:
Herman J. Hammerly,
by His Attorney.

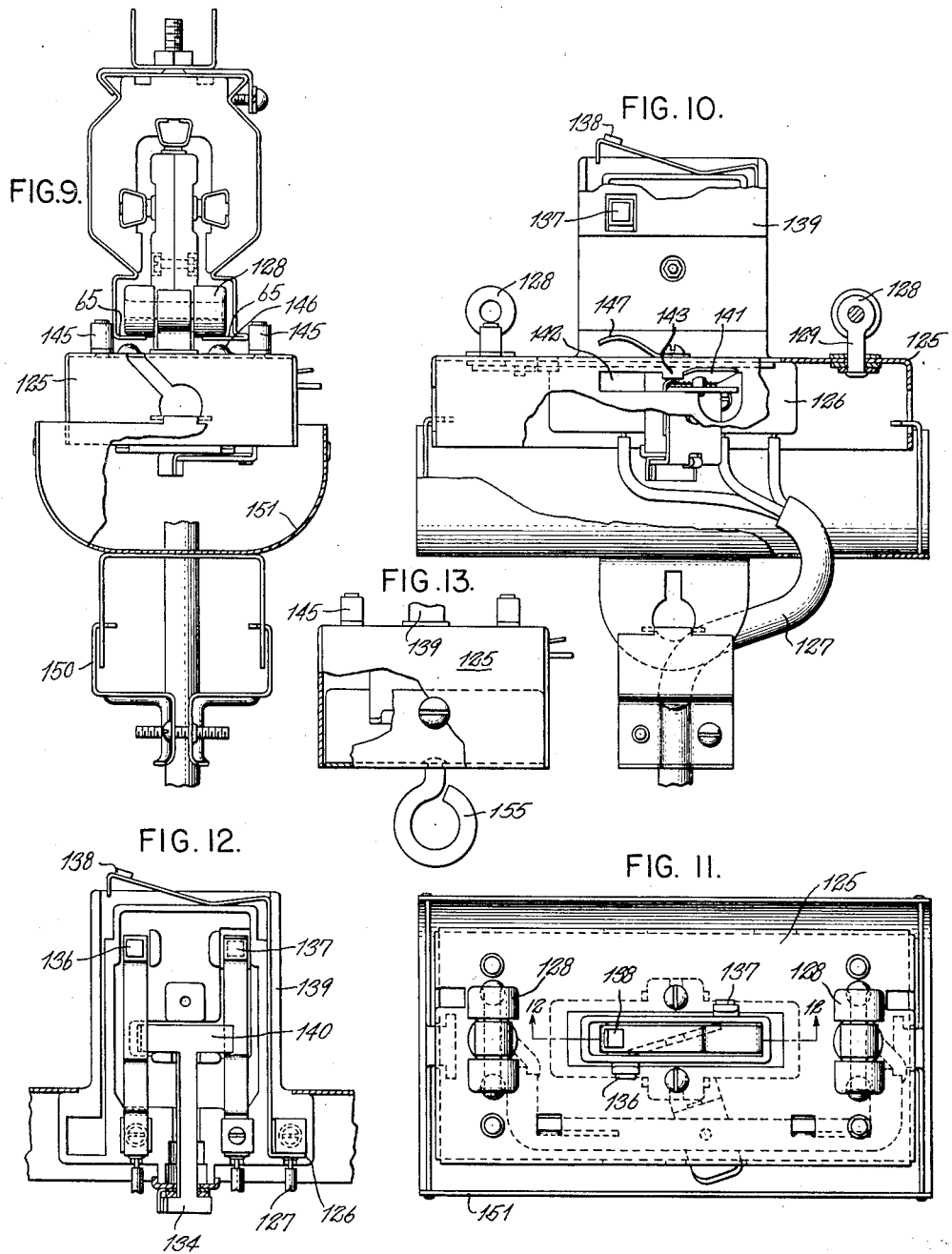

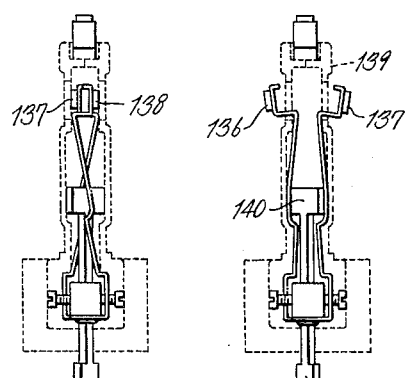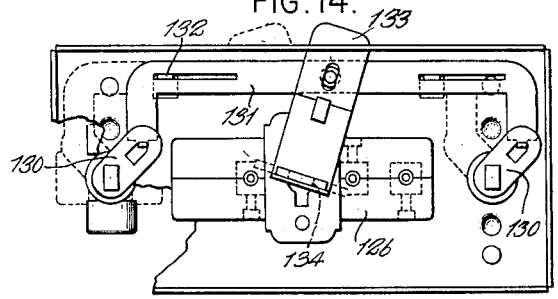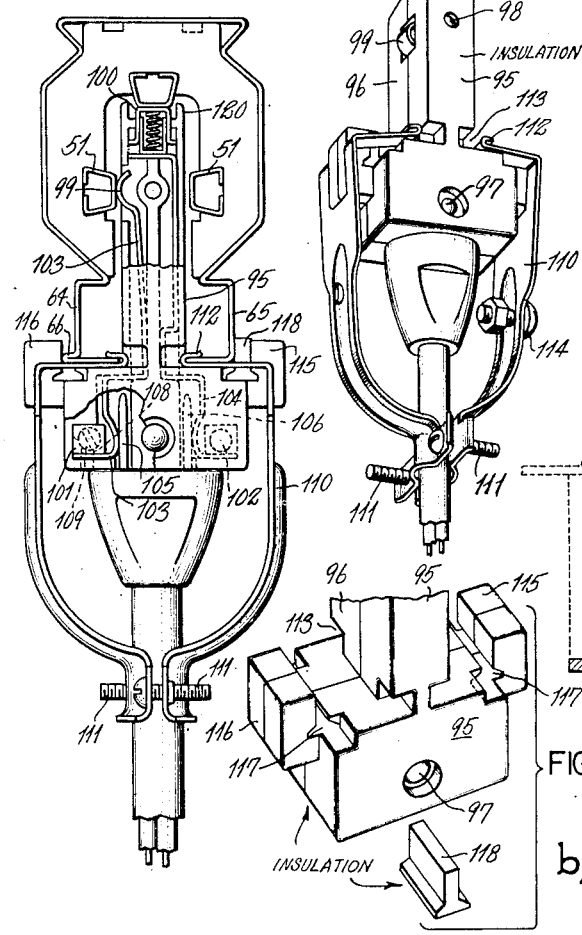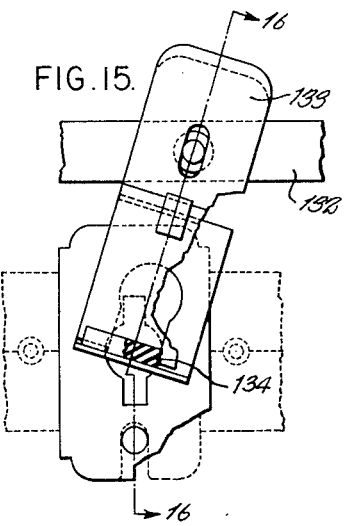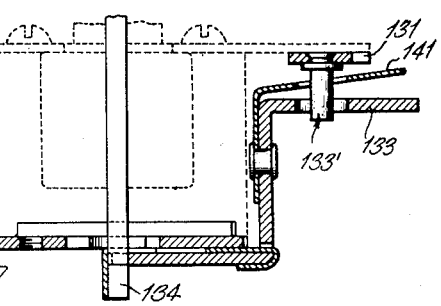

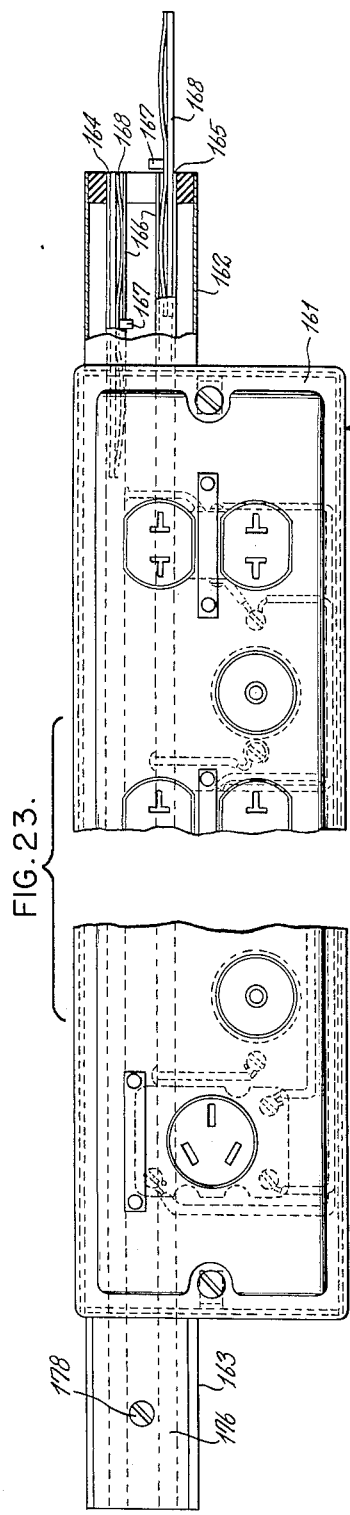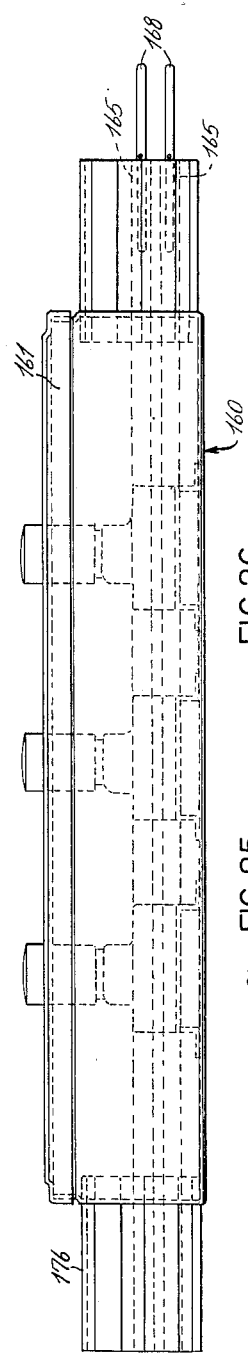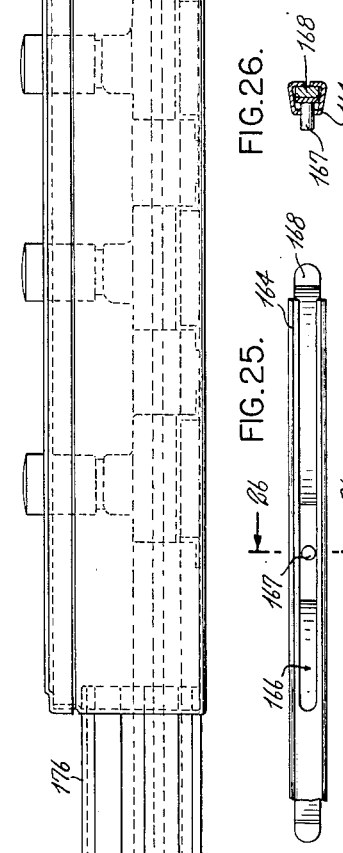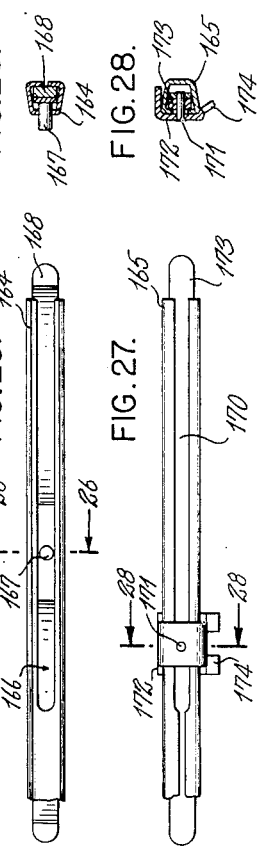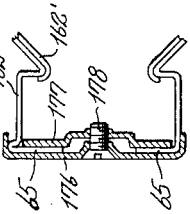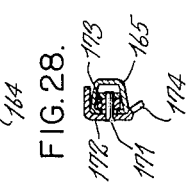
INVENTOR.
Herman J. Hammerly,
His Attorney

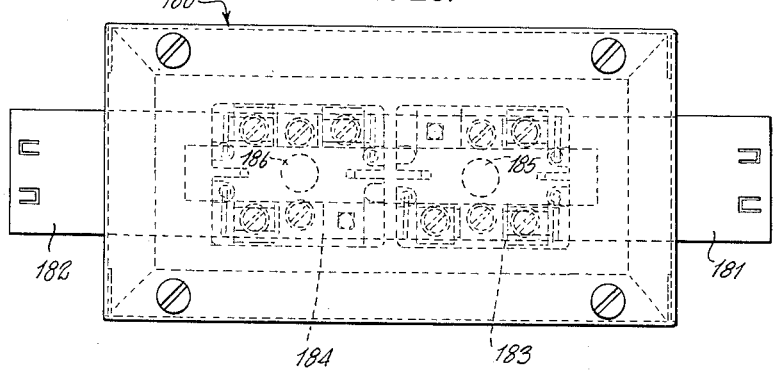
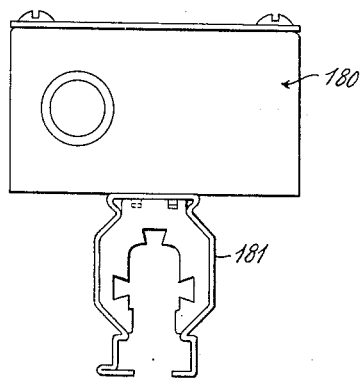
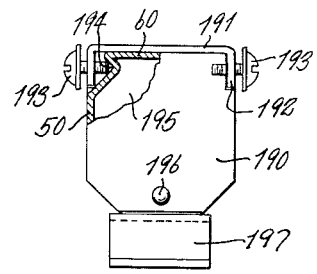
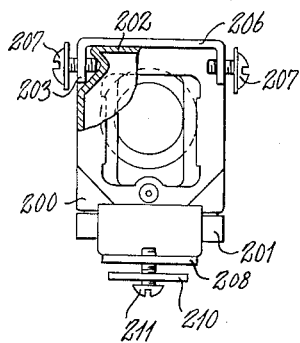
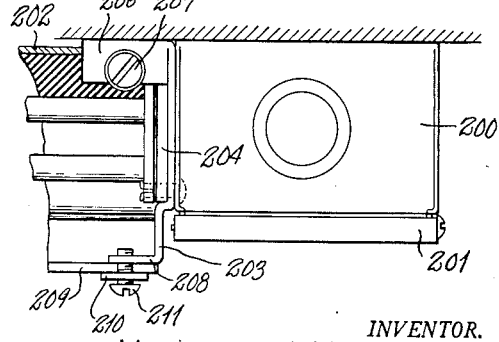

Jan. 20, 1953  H. J. HAMMERLY  2,626,301
BUS DUCT SYSTEM OF POWER DISTRIBUTION
Filed Jan. 29, 1949  6 Sheets-Sheet 6

INVENTOR.
Herman J. Hammerly,
BY
His Attorney.

Patented Jan. 20, 1953

2,626,301

UNITED STATES PATENT OFFICE 2,626,301

BUS DUCT SYSTEM OF POWER DISTRIBUTION

Herman J. Hammerly, Plainville, Conn., assignor, by mesne assignments, to General Electric Company, a corporation of New York Application January 29, 1949, Serial No. 73,570

6 Claims. (Cl. 174—99)

This invention relates to bus duct systems of power distribution having enclosed bus bars and a slotted enclosure which provides for access to the bus bars.

The main object is to provide a simple, compact and efficient form of duct and bus bar system having a maximum adaptability to multiple wire systems and having interchangeable accommodation for plug-in power take-off as well as trolley take-off devices.

Another object is to provide a system the parts of which are inexpensive and capable of convenient installation.

A more specific object of the invention is to provide an enclosing duct of new and improved form which supports both the bus bars and a variety of movable take-off devices and includes convenient means for suspension of the entire apparatus.

Another object is to provide an improved enclosing duct readily adapted for the polarized connection of a variety of movable power take-off devices.

Another object is to provide a simple, efficient and readily assembled form of bus bar and insulating support.

The improvements apply to the form of duct, the form of bus bars, the means for supporting the bus bars, means for supporting the ducts, means for supporting take-off devices, and means for polarizing the take-off devices and duct.

The drawings show the features of the invention and some of the attachments cooperating with them.

Fig 1 is a perspective view showing part of a duct system with a center feed-in box, a plug-in power take-off, a trolley collector, a duct supporting or suspension means and a fixture support embodying my invention.

Fig. 2 is a fragmentary perspective view of the end of a duct and jacks for connecting bus bars of two sections and a fixture support.

Fig. 3 is a face view of a fragment of an insulator for supporting a bus bar and showing the end of a bus bar.

Fig. 4 is a fragmentary view of the back of a part of one form of bus bar.

Fig. 5 is a face view of a fragment of an insulator and showing in section a bus bar in position to be assembled in the insulator.

Fig. 6 is an exploded end view of a duct section with three bus bars and a plug-in type of trolley collector ready to be inserted in the duct, the housing for the take-off being shown partly detached from the body of the collector.

Fig 7 is an end view of the duct together with a three-pole trolley collector in a fully inserted position in the duct but not locked.

Fig. 8 is a view similar to Fig. 7 with the trolley section locked in the duct and showing in dotted lines the cradle of the housing tilted from side to side.

Fig. 9 is an end view and partial section showing the duct with its bus bars and a trolley collector supported by the duct. This view also shows a suspension clamp for the duct and a strain relief for the power take-off.

Fig. 10 is a side view of the trolley collector, parts being broken away.

Fig. 11 is a top plan view of the trolley collector of Fig. 7

Fig. 12 is a side view of the interior of the plug take-off of Figs. 9, 10 and 11 showing the plug take-off in position in a fragment of the body of the collector.

Fig. 13 is an end view and partial section of a modified form of the collector body with a depending eye or hook.

Fig. 14 is a bottom plan view of a trolley collector similar to Fig. 11, parts being broken away.

Fig. 15 is an enlarged fragmentary view showing the actuating and locking mechanism for the contacts and the supporting rollers.

Fig 16 is a cross-sectional view of the actuating and locking mechanism of Fig. 15, the section being on the plane of the line 16—16 of Fig. 15 and also showing in dotted lines the outline of part of the collector body.

Fig. 17 is an edge view of the plug contacts of the trolley collector showing the insulating housing for the plug take-off in dotted lines and the lateral contacts retracted.

Fig. 18 is a view similar to Fig. 17 but showing the lateral contacts spread apart.

Fig. 19 is an end view of a duct and bus bar section with a plug-in type collector in place, parts being broken away.

Fig. 20 is a perspective view of the plug-in collector of Fig 19.

Fig. 21 is an exploded fragmentary view of the lower end of a plug-in body and showing the means for polarizing the take-off device on the bus bar system.

Fig. 22 is a side view of a monitor box and a duct section on a small scale.

Fig. 23 is a face view of the box of Fig. 22 omitting the central part of the box and contained parts which are mere duplicates of the parts shown in Fig. 22. This figure also shows retractable jacks for connecting such a box and duct section between the ends of an installed duct system.

Fig. 24 shows an end view and partial section of such a duct with a dust cap.

Fig. 25 shows a face view of a bus bar with one form of retractable jack for such a system.

Fig. 26 is a cross-section of the same on the plane of the line 26—26 of Fig. 25.

Fig. 27 is a view of the rear of a bus bar with a modified form of retractable jack.

Fig. 28 is a cross sectional view on the plane of the line 28—28 of Fig. 27.

Fig. 29 is a plan view of one form of center feed-in box mounted on a bus bar duct the bars being omitted.

Fig. 30 is an end view of the parts of Fig. 29, the bus bars being omitted.

Fig. 31 is a detail view of a closure plate for an end of a duct.

Fig. 32 is a side view of an end feed-in box showing it attached to a fragment of a duct.

Fig. 33 is an end view and partial section showing an end plate with a wiring knock-out for the end box of Fig. 32.

Figure 34:
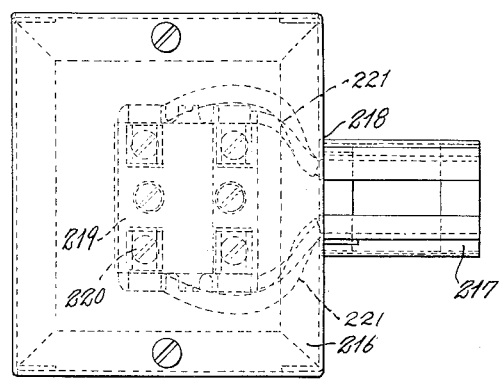
Fig. 34 is a face view of one form of end feed-in box in line with a duct, the bus bars being wired to a supporting block in the box.

The duct itself is formed of sheet metal rolled, drawn or otherwise formed into a channel-like shape and as shown in Fig. 1 consists of three sections 50, 50' and 50x. As a general thing the duct would be made up of a number of sections in 10 foot lengths with a section of say 2 feet in length inserted into the main run at intervals therealong for convenience in assembly and to accommodate power supply etc.

Two, three or more bus bars 51 are supported at intervals by insulators such as 52. These insulators are of arched or inverted U-shape. The insulators at each end of each section of the duct are of molded insulating material and of considerable thickness but the other intervening insulators need not be so thick. Each bus bar is formed of suitable conductive material formed in the shape of a hollow tube of trapezoidal section with a slot 53 between the outer edges. The corners of the bus bars are preferably rounded off to reduce danger of flash over from static voltage. Each insulator has a wedge-shaped or dove-tail slot 54 to accommodate a bus bar and each bus bar 51 has a number of indented sides as shown at 55 to facilitate assembling the bus bars and insulators. When the insulator is applied to one of the indented parts of a bus bar, the insulator is slid along the bus bar to its final position where it is interlocked with the bus bar. To hold the end insulator in position, it is provided with recesses such as 56 into which tongues 57 and 58 are adapted to fit when the insulator is inserted into the end of the duct. These tongues are stamped from the top or rear wall 60 of the duct.

Adjacent the opposite edges of the back of the duct its sides are indented as at 61 where they form shoulders for positioning the insulators and also provide grooves for the attachment of hangers hereinafter described. The insulators also fit snugly against the inner walls of the sides 62. The sides of the duct are also indented at 63 to form supporting shoulders for the insulators and for forming the upper walls of channels having side walls 64 and have inturned lower flanges 65, 65. These channels provide runways for wiring and the flanges 65, 65 constitute tracks for trolley take-offs. One of the side walls is extended at 66 to form a lip or flange outside the channel to facilitate polarizing the system as will be hereinafter described.

The adjacent ends of duct sections and their bus bars are connected by special jacks, each of which is made up of an elongated bar or rod 67 and a double-ended spring contact strip 68 and are connected by a rivet 69 which constitutes a pivot enabling the contact strip to be tilted on such pivot to provide access to the ends of the contact strip in case they need adjustment.

To prevent a jack from being thrust too far into its bus bar a notch 70 is provided in the end of the bus bar adapted to receive the head of the rivet 69 which head serves as an abutment.

Figure 39:
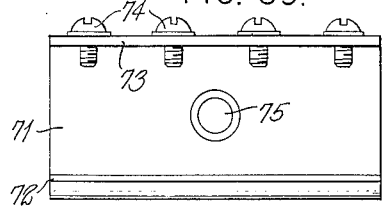
Fig. 39 is a detail plan view of a clamp for connecting two duct sections or for supporting a duct.
Figure 40:
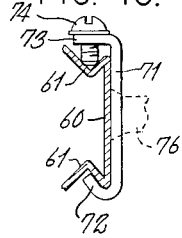
Fig. 40 shows a fragmentary section of a duct with such a clamp attached.

A clamp plate 71 serves not only to connect two duct sections but also provides means for attachment of a hanger. This clamp plate 71 is shown in Figs. 39 and 40 and has a flange 72 along one edge adapted to fit into a groove 61 in one edge of the duct, and with a flange 73 at its opposite edge with a number of clamp screws 74 which are adapted to seat in the opposite groove 61 of the duct. The center of the plate 71 is provided with a passage 75 to accommodate a bolt 76 for a hanger member. Such hanger members are shown in Fig. 1. Each hanger member has a base plate 77, side posts 78, 78 and overlapping flanges 79, 79 and also hook-like fingers 80, 80 extending from the edges of said posts. One of the hanger members is shown in Fig. 1 connected to plate 71 by bolt 76, and is shown suspended from a messenger wire 81 and the other hanger member is shown connected by a bolt 82 to a supporting beam 83 for supporting the messenger wire.

The hanger construction is claimed in application Serial Number 73,639 filed January 29, 1949, by W. J. Fleming, now Patent No. 2,523,869 dated September 26, 1950.

Figure 37:
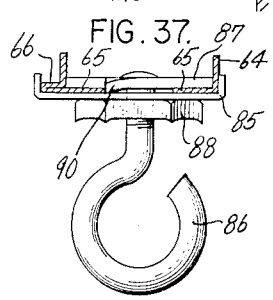
Fig. 37 shows a hanger clamp attached to a fragment of a duct in section.
Figure 38:
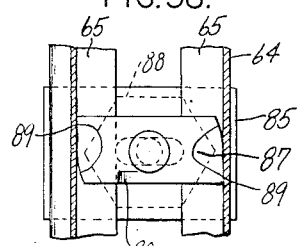
Fig. 38 is a section and plan view of the parts of Fig. 37.
Figure 41:
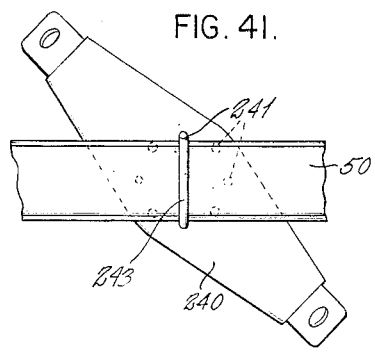
Fig. 41 is a plan view showing means for supporting a lamp or other body from a duct at various angles.
Figure 42:
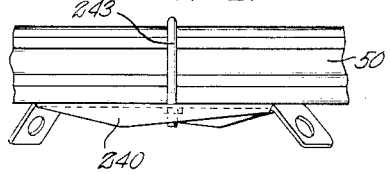
Fig. 42 is a side view of the parts of Fig. 41.

The side walls of the duct may be connected at intervals by attachments such as shown in Figs. 2, 37 and 38. Each attachment has a plate 85 flanged at its opposite edges to embrace the opposite edges of the duct. In the form shown this attachment has a supporting hook-like member 86 which is secured to a cross bar 87. This cross bar is just narrow enough to be inserted through the slot between the flanges 65, 65 and long enough to extend across the flanges when the cross bar is rotated. The cross bar is riveted or otherwise fixed to the upper end of the screw-threaded shank of the hook 86. The clamp plate 85 is provided with a transverse slot 88 to permit the bar 87 to move transversely and adjust itself to a seat on the flanges 65, 65. The ends of the cross bar 87 are rounded off at 89 to form camlike shoulders and thus provided a snug fit and spread the walls 64 of the duct outwardly against the flanges of the clamp plate 85. The cross bar 87 may also have a depressed lug 90 which tends to prevent accidental rotation of the cross bar when the clamp nut 91 is tightened.

The duct may be reinforced if desired by applying clamps such as shown in Figs. 37 and 38 to the open face of the duct at intervals therealong.

The clamp and hanger construction shown in Figs. 2, 24, 37 and 38 is claimed in application Serial Number 73,493 filed January 29, 1949, by A. H. Veitch, now Patent No. 2,523,888 dated September 26, 1950.

It will be seen that each bus bar is supported at spaced-apart points so that it is surrounded by air throughout the greater portions of its length. The duct may however be additionally lined with insulation for a high voltage system (see Figs. 24 and 35).

Although the drawings show a straight run of duct and bus bars it will be understood that the duct can be suspended from above or secured to a wall and may be cut to turn corners either about the back, front or sides.

One form of plug-in type power take-off is shown in Figs. 19, 20 and 21. The body of the plug is formed of two parts of insulation 95 and 96 held together by rivets or screws 97 and 98. The outer end of the body is adapted to be inserted through the slot in the duct and has contacts 99 and 100 adapted to engage one of the side bus bars and the top bar respectively. The base of the plug has terminal blocks 101 and 102 to which are attached the spring arms 103 and 104 which carry the contacts 99 and 100. The tip contact is spring-pressed as shown in Fig. 19. The base of the plug is slotted to admit the blades 105 and 106 of the attachment plug 107. Each terminal block 101 and 102 may also have a passage 108 for the insertion of a wire which can be secured by a set screw 109.

A yoke 110 has spring arms which spring outwardly when the screws 111 are tightened. The outer ends of these arms have hooks 112 adapted when the plug is inserted to engage the flanges 65, 65 of the duct and hold the plug in place. In order to release the plug the arms of the yoke are pressed toward each other, the base of the plug being recessed at 113 to allow for the hooks 112. The yoke may be grounded by a conductor attached to screw 114 (Fig. 20).

In order to be able to polarize the system, that is, to compel the plug to be inserted so as to draw current from either the right or left bus bar 51 of Fig. 19, I provide shoulders 115 and 116 which extend from the body of the plug just far enough to clear the outer flange 66. I then provide an undercut groove 117 to receive a stop 118 just thick enough to leave enough space for the plug body to be inserted as shown in Fig. 19. This thickness is substantially equal to the width of the outer flange 66 of the duct. In the form shown, if the stop 118 is omitted the plug can be inserted to the position of Fig. 19 where contact 99 engages the left hand bus bar 51 and it can be turned and inserted so that the contact 99 engages the right hand bus bar 51. With the stop 118 inserted in the right hand groove 117, the plug can be inserted so that the contact can engage the left hand bus bar. By inserting a stop in one side or the other of the plug, the plug can be arranged to connect only with either side of the circuit.

In case the plug is inserted carelessly in a tilted position and to guard against accidental contact between the end contact 100 and some undesirable metallic part, the plug body is provided with integral side flanges 120 alongside of the end contact.

Each of the spring arms of the yoke 110 has an opening 110' which receives the insulating shoulders 115 and 116 of the plug so as to add to the strength of the strain relief.

The plug-in type of take-off device is claimed in application Serial No. 78,102 filed February 24, 1949, by C. B. Turton, R. H. Salomone and me, and now issued as Patent 2,611,801.

The details of trolley improvements adapted to the system are illustrated in Figs. 1 and 6 to 18, inclusive. A box-like body 125 has a terminal block 126 for conductors 127 and at its top carries two double rollers 128, 128, one at each end, which when in place in the duct ride on the flanges 65, 65. These rollers are mounted on shafts 129 which are rotatably supported by the top plate of the box so that the rollers can be turned or swiveled from a running position as shown in Figs. 8 and 9 to a non-running position such as shown in Fig. 7 so that the trolley collector can be removed or inserted through the slot between the flanges of the duct. To turn the shafts of the rollers, each roller is provided with an arm 130 and these arms are connected by a bar 131 which slides on the lugs 132 and is actuated by a lever 133. The inner end of this lever 133 is connected to a vertical shaft 134 which is rotatably supported in the block 126. The lever 133 is mounted on the inner end of shaft 134 and has a guiding slot-and-pin connection 135 with the bar 131 as shown in Fig. 14.

The movable contacts 136, 137 and 138 for the trolley collector are supported in the extension 139 of the block 126 and are normally in the retracted position of Fig. 17 but adapted to be projected from the sides of the extension 139 to the position as shown in Fig. 18, by the action of the cam 140 on the upper end of the shaft 134. The extension 139 is thin enough to be inserted through the slot between the flanges 65, 65 when the contacts 136 and 137 are retracted, but is wide enough lengthwise of the duct to provide proper housing for the contacts and the actuating cam. When the collector is disconnected from the duct, the side contacts are retracted and the rollers are in alinement as shown in Fig. 7 so that the collector can be inserted into the duct or removed therefrom. When the collector is inserted the rollers and the contacts may be simultaneously actuated by swinging the lever 133 from the position shown in dotted lines in Fig. 14 to the position shown in full lines in the same figure.

To avoid unintentional actuation of the lever 133, a spring latch 141 is provided which is secured to the lever 133 and operates in a slot 142 in the wall of the housing. In the center of the slot is a lug 143 which holds the latch 141 either to the right or left as shown in Fig. 10. In order to actuate the lever, the latch 141 must be depressed in order to clear the lug 143.

The top of the box 125 is provided with guide rollers 145 which serve as guides for the box against the flanges of the duct.

When inserting the collector, bosses 146 on the top of the box 125 engage the underside of the flanges 65, 65 so as to limit the insertion of the collector and prevent the rollers 128 engaging the upper walls of the side channels of the box. A spring 147 on the box 125 serves to ensure grounding the box and duct.

In one form of collector, a strain relief yoke 150 has a cradle 151 which has a lug 152 at each end pivoted in a slot 153 in the box 125 so that the strain relief and cradle may be tilted from one side to the other as suggested in Figs. 6 and 8.

The construction of the trolley type take-off device is claimed in application Serial Number 78,103 filed July 24, 1949, by C. B. Turton and me, now Patent No. 2,536,282 dated January 2, 1951.

In the form of collector shown in Fig. 13, the bottom of the box 125 is provided with a hook or eye 155 for convenience in moving the collector and for the attachment of a cable or other device (not shown).

It will thus be seen that the housing is closed at the top or back and provided with inwardly projecting flanges 65 with an entrance passage between them at the bottom, and the contractions 63 at the opposite sides of the housing divide the housing into an upper chamber and a lower chamber. The upper chamber contains the bus bars accessible to the contacts of take-off devices inserted through the entrance passage at the bottom and the lower chamber provides guide ways for conductors and for trolley take-off carriage devices. The flanges 65 provide tracks for the carriage devices and supports for the clamps of plug-in take-off devices.

Figs. 22 and 23 illustrate a monitor unit having a box 160 having a cover 161 and extension duct sections 162 and 163. The bus bars such as 164 and 165 extend from end to end through the box and duct extensions and are anchored at the ends. Fuse plugs, attachment plugs and other testing devices are mounted in this box and wired to the respective bus bars.

The construction of the monitor unit with retractable jacks is claimed in my application Serial Number 87,950 filed April 16, 1949.

Such a box is intended to be installed between two sections of duct having bus bars arranged in the same manner as in the box. In order that such a construction can be readily installed or removed the alined bus bars are provided with retractable jacks such as shown in Figs. 23 and 25 to 28. Each bus bar such as 164 may have a slot 166 extending along its contact face to allow for the passage of the knob 167 of its jack 168 so that the jack may be entirely retracted so as to disconnect the unit from the adjacent duct section (not shown).

An alternative arrangement is shown in Figs. 27 and 28. In this case the bus bar 165 has an open slot 170 along the back to allow for a rivet 171 of a plate 172 which is riveted to the jack 173 and has a projection 174 which extends around one edge of the bus bar to provide for engagement of a tool inserted into the duct for sliding the jack along the bus bar.

The construction involving the retractable jack is claimed broadly in my application Serial Number 85,996 filed April 3, 1949.

The exposed duct may be provided with a dust cover 176 as shown in Figs. 22, 23 and 24 where the cover has flanges adapted to overlap the outer flanges of the duct 162 as shown more clearly in Fig. 24. This cover is held in place by a cross bar 177 which overlies the flanges 65, 65 inside the duct and is clamped in place by a screw 178 which may be countersunk. The cross bar being somewhat resilient serves as a nut lock to hold the parts snugly together. In fact, in some cases, the entire duct can be closed except for limited areas where collector plugs are to be inserted.

Figure 35:
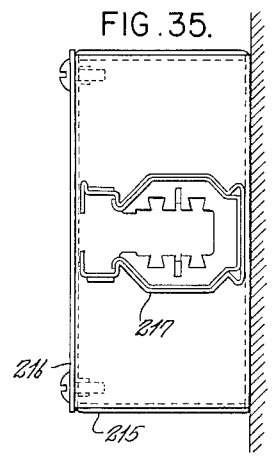
Fig. 35 is an end view of the same showing the back of the box against a wall.
Figure 36:
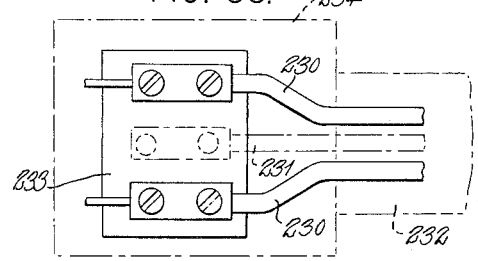
Fig. 36 shows the ends of the bus bars offset for connection to such a mounting block in such a box.

The interior of the duct, especially the part in which the bus bars are mounted may be lined with insulating material as indicated at 162' in Fig. 24 and at 217' in Fig. 35.

As the duct sections are secured at one side of the monitor box or "off center," two boxes can be nested for compactness. Although the monitor box as shown has four bus bars, it should be understood that the exact number is not material to the invention.

Figs. 29 and 30 show a center power intake unit having a box 180 mounted on the top of duct sections 181 and 182. Terminal blocks 183 and 184 are mounted in the box from which wires (not shown) suitably introduced are passed through openings 185 and 186 in the bottom of the box to the bus bars in the duct sections.

Any end of a duct section, such as 50 may be closed by an end plate 190. This plate has a top piece 191 which rests on the top 60 of the duct and side flanges 192 through which screws 193 pass into grooves 194 in the duct. The bus bar compartment may be protected by an insulating plate 195 held by a rivet or screw 196 and the lower end 197 of the plate covers the track-way compartment of the duct.

This end closure device is claimed in application Serial No. 76,874 filed February 17, 1949, by C. B. Turton and now issued as Patent 2,572,218. The construction shown in Figs. 29, 30, 32 and 39 is claimed in application Serial No. 75,566 filed February 10, 1949, by R. A. Salomone and C. B. Turton and assigned to the same assignee as the instant application.

A power intake box unit 200 having a cover 201 may be provided at the end of a duct 202 as shown in Fig. 32. The end plate 203 is similar to that shown in Fig. 31 but has a passage for bus bars to a terminal block (not shown) in box 200 or for flexible jacks to connect with the bus bars. Insulating plate 204 may have perforations for individual bus bars. Plate 203 has a top flange 206 secured to the duct by screws 207. The lower end of plate 203 has a flange 208 which extends into the duct and is clamped to the flange 209 by a cross piece 210 and screw 211.

In the form shown in Figs. 34 and 35, the end feed-in box 215 has a removable cover 216 and the duct 217 is brazed or welded to the box as at 218. The terminal block 219 has terminal lugs 220 with flexible leads 221 to jacks for insertion into the bus bars (not shown) in the duct.

As an alternative connection, the bus bars 230 and 231 may be led directly from the duct 232 to connectors in the block 233 in the box 234 and bent or offset where most convenient.

The duct 50 is strong enough mechanically to support a considerable load and small enough to arrange for simple connections such as the suspension of a hanger 240 for a fluorescent lamp (not shown). This hanger is provided with a number of holes 241 arranged at intervals around the center of the hanger so that the hanger may be arranged at various angles with respect to the duct and suspended by a U-shaped bar 243.

From the foregoing it may be seen that the bus duct system is adapted to a multitude of uses.

It will be understood that changes in details might be made without departing from the principle of the invention.

I claim:

1. In an electric bus distribution apparatus, a tubular metallic enclosing duct longitudinally slotted on its lower side and having opposed supporting channels formed integrally therewith at opposite sides of the slot, said channels having lower flanges of dissimilar shape, a plurality of bus bars mounted in said duct in parallel spaced relation and extending longitudinally thereof, and removable electric connecting means having contact portions projecting through said slot to engage said bars and having supporting means detachably engaging said lower flanges, said connecting means including guiding abutments unsymmetrically positioned for complementary engagement with said dissimilar lower flanges in predetermined polarizing positional relation.

2. In an electric bus distribution apparatus, a longitudinally slotted tubular enclosing duct, a plurality of U-shaped insulators mounted transversely in said duct in spaced apart relation and each having at least one undercut recess of trapezoidal cross section on an inner face thereof, and a hollow tubular bus bar of trapezoidal cross section having its normally diverging side walls oppositely indented into parallel spaced relation at spaced apart points thereby to facilitate insertion of said bus bar into said undercut recesses in said insulators.

3. In a bus bar duct system, an elongated metallic housing having a top wall and downwardly extending side walls, said side walls being indented adjacent the top wall for forming opposed grooves along the housing at the top to receive devices for suspending the housing to an overhead support, said side walls being tapered inwardly at their bottom ends, an extension formed integrally with the lower tapered ends of the side walls of the housing, said extension comprising opposed channel members with their openings in opposed relation in a horizontal plane, the lower walls of the extension forming tracks for the wheels of a trolley type plug and serving as supports for attachment of an inserted plug, substantially arch-shaped insulating plates spaced along the inside of the housing and tubular bus bars supported in spaced relation on the side and top inner surfaces of the plates with a portion of each bus bar projecting into the space between said side and top surfaces for engagement by the contacts of an inserted plug member.

4. In a bus bar duct system, a metallic duct having a top wall, side walls depending from the top wall, flanges extending inwardly from the lower edges of the side walls, insulators of inverted U-shape supported at intervals in the space between the side walls, bus bars of trapezoidal cross section supported in the inner edges of said insulators, each bus bar having its widest side slotted lengthwise and supported in undercut recesses in its supporting insulators, each bus bar having an uninterrupted contact surface extending from the edge of its supporting insulator.

5. In a bus duct system of power distribution, a duct section having a top wall, depending side walls and inturned bottom flanges spaced apart at the lower edges of the side walls, said side walls having inwardly projecting longitudinal indentations located between the top wall and the respective flanges, insulators of inverted U form supported between said side walls on said inwardly projecting indentations, tubular bus bars of trapezoidal cross section partially dovetailed into undercut recesses in opposite inside edges of said insulators and having protruding contact faces spaced apart to receive between them the side contacts of plugs inserted between the spaced apart bottom flanges of the duct section.

6. In a bus duct system of power distribution, a plurality of similar duct sections disposed end to end and each formed of a single sheet of metal and having a bus bar chamber closed at the top and a trolley chamber having spaced flanges at the bottom for supporting trolley wheels, the sides of the duct having inwardly projecting longitudinal indentations between and defining said chambers, a plurality of spaced apart U-shaped insulators in the bus bar chamber having their side legs supported on said indentations, a plurality of tubular bus bars of trapezoidal cross sections partially embedded in undercut slots in the inner edges of said insulators and spaced apart to engage the side contacts of trolley carrier plugs mounted on a trolley running on said bottom flanges, and connecting jacks slidable into adjacent ends of said tubular bus bars to electrically connect corresponding bars of said duct sections.

HERMAN J. HAMMERLY.

REFERENCES CITED

The following references are of record in the file of this patent:

UNITED STATES PATENTS

| Number | Name | Date |
|---|---|---|
| 1,157,026 | Meschenmoser | Oct. 19, 1915 |
| 1,277,071 | Hastings | Aug. 27, 1918 |
| 1,561,495 | Thompson | Nov. 17, 1925 |
| 1,869,145 | Greis | July 26, 1932 |
| 1,988,627 | MacLellan | Jan. 22, 1935 |
| 2,026,884 | Glasgow | Jan. 7, 1936 |
| 2,076,558 | Hartman | Apr. 13, 1937 |
| 2,210,171 | Horn | Aug. 6, 1940 |
| 2,269,779 | Morten | Jan. 13, 1942 |
| 2,310,024 | Frank | Feb. 2, 1943 |
| 2,351,632 | O'Brien | June 20, 1944 |
| 2,412,382 | Anderson | Dec. 10, 1946 |
| 2,441,698 | Gerspacher | May 18, 1948 |

FOREIGN PATENTS

| Number | Country | Date |
|---|---|---|
| 840,456 | France | Apr. 26, 1939 |